United States Patent
Fujii

(10) Patent No.: US 9,738,558 B2
(45) Date of Patent: Aug. 22, 2017

(54) PROCESSING METHOD OF GLASS BASE MATERIAL FOR OPTICAL FIBER

(71) Applicant: Shin-Etsu Chemical Co., Ltd., Tokyo (JP)

(72) Inventor: Hideki Fujii, Ibaraki (JP)

(73) Assignee: Shin-Etsu Chemical Co., Ltd., Ibaraki (JP)

( * ) Notice: Subject to any disclaimer, the term of this patent is extended or adjusted under 35 U.S.C. 154(b) by 24 days.

(21) Appl. No.: 14/692,745

(22) Filed: Apr. 22, 2015

(65) Prior Publication Data

US 2015/0299023 A1    Oct. 22, 2015

(30) Foreign Application Priority Data

Apr. 22, 2014  (JP) ................. 2014-087951

(51) Int. Cl.
C03B 37/025    (2006.01)
C03B 37/012    (2006.01)

(52) U.S. Cl.
CPC ......... C03B 37/01242 (2013.01); *Y02P 40/57* (2015.11)

(58) Field of Classification Search
CPC .......... C03B 37/0253; C03B 37/01242; C03B 2205/45
See application file for complete search history.

(56) References Cited

U.S. PATENT DOCUMENTS

2008/0271493 A1*  11/2008  Nakanishi ........... C03B 37/0124
                                                          65/382

OTHER PUBLICATIONS

Office Action issued for counterpart Japanese Application 2014-087951, issued by the Japan Patent Office dated Apr. 5, 2017.

* cited by examiner

*Primary Examiner* — Queenie Dehghan

(57) ABSTRACT

Provided is a method of processing a glass base material for optical fiber in which the glass base material for optical fiber is elongated to reduce a diameter thereof until reaching a final elongation diameter and form a completed base material. The method includes measuring an outer diameter distribution that includes an outer diameter of the glass base material for optical fiber; setting an effective region; calculating a target elongation diameter that is larger than the final elongation diameter and less than an average diameter of the effective region, and elongating the glass base material for optical fiber until reaching the target elongation diameter; and after reaching the target elongation diameter, further elongating the glass base material for optical fiber until reaching the final elongation diameter.

8 Claims, 2 Drawing Sheets

PROCESSING METHOD OF GLASS BASE MATERIAL FOR OPTICAL FIBER

BACKGROUND

The contents of the following Japanese patent application are incorporated herein by reference:
NO. 2014-087951 filed on Apr. 22, 2014.

1. Technical Field

The present invention relates to a processing method of a glass base material for optical fiber.

2. Related Art

A glass base material for optical fiber is heated, softened, and elongated to form a completed base material that has an average outer diameter, an outer diameter fluctuation, and a length suitable to a drawing device, and then this base material is drawn by the drawing device to form optical fiber.

If there is a large amount of outer diameter fluctuation across the entire length direction of the glass base material prior to the processing or if there is outer diameter fluctuation within a relatively short region, then it is possible that the diameter of the thick portion of the glass base material is not sufficiently reduced, which results in a large amount of outer diameter fluctuation in the completed base material after the processing.

SUMMARY

According to a first aspect of the present invention, provided is a method of processing a glass base material for optical fiber in which the glass base material for optical fiber is elongated to reduce a diameter thereof until reaching a final elongation diameter and form a completed base material. The method includes, before elongating the glass base material for optical fiber, measuring an outer diameter distribution that includes an outer diameter of the glass base material for optical fiber at a plurality of measurement points in a longitudinal direction of the glass base material for optical fiber; setting an effective region that is continuous in the longitudinal direction in the glass base material for optical fiber, based on the measured outer diameter; calculating a target elongation diameter that is larger than the final elongation diameter and less than an average diameter of the effective region of the glass base material for optical fiber that is calculated based on the measured outer diameter, and elongating the glass base material for optical fiber until reaching the target elongation diameter; and after reaching the target elongation diameter, further elongating the glass base material for optical fiber until reaching the final elongation diameter.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
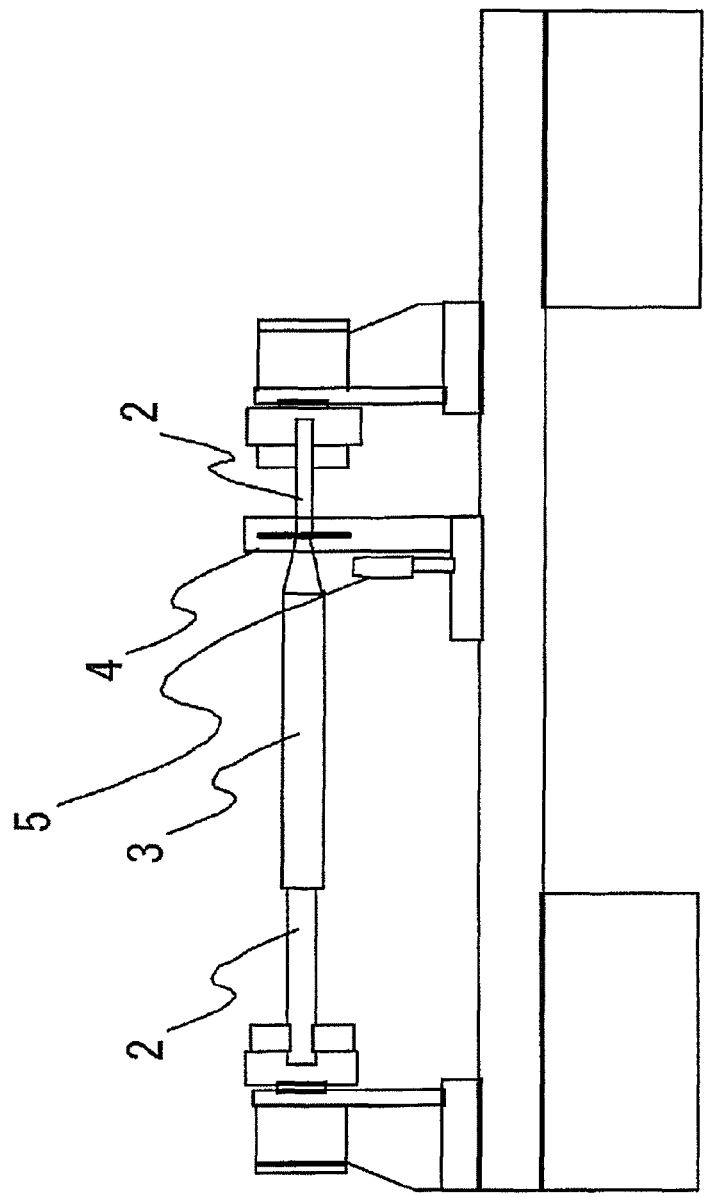
FIG. 1 is a schematic view of a glass lathe 1.

FIG. 1 is a schematic view of a glass lathe 1 that can be used when processing a glass base material for optical fiber 3 to form a completed base material. The glass lathe 1 includes a diameter measurement device 4 and a heat source 5.

The glass base material for optical fiber 3 that is to undergo the processing may be manufactured using VAD, OVD, or the like. Specifically, a porous glass base material is formed by supplying a burner with glass raw material such as silicon tetrachloride along with oxygen gas and hydrogen gas to cause a flame hydrolysis reaction and depositing the generated glass microparticles on a starting substrate, and then performing dehydration and transparent vitrification on the resulting material to form the glass base material for optical fiber 3. The glass base material for optical fiber 3 obtained in this manner has an overall shape that is substantially cylindrical.

When performing processing with the glass lathe 1, glass support rods (dummy rods) 2 are fused to both of the longitudinal ends of the glass base material for optical fiber 3. Chucks of the glass lathe 1 grip the glass base material for optical fiber 3 at the dummy rod 2 portions. In this way, the surface of the glass base material for optical fiber 3 itself is prevented from being damaged by the chucks.

Furthermore, when heating regions of the glass base material for optical fiber 3 near the ends thereof, the heat damage experienced by the chucks due to the heat generated by the heat source 5 can be reduced. Cylindrical glass rods with a small amount of outer diameter fluctuation are preferably used as the dummy rods 2. In this way, the axial skew occurring when the glass base material for optical fiber 3 is rotated by the glass lathe 1 can be reduced.

With the glass lathe 1, the glass base material for optical fiber 3 is processed to form the completed base material having an average outer diameter, an outer diameter fluctuation value, and a length suitable to a drawing device that is to be used. This completed base material is then drawn by the drawing device to form optical fiber. The outer diameter fluctuation value can be calculated as the difference between the maximum outer diameter and the minimum outer diameter of the glass base material for optical fiber 3 as measured across the effective region thereof.

When processing the glass base material for optical fiber 3 to form the completed base material, the chucks of the glass lathe 1 are rotated and, while rotating the glass base material for optical fiber 3, the heat source 5 is moved relative to the glass base material for optical fiber 3 in the longitudinal direction of the glass base material for optical fiber 3. Furthermore, while heating the glass base material for optical fiber 3, the space between the left and right chucks of the glass lathe 1 is widened, thereby reducing the outer diameter of the glass base material for optical fiber 3 while elongating the glass base material for optical fiber 3 in the longitudinal direction.

Before being machined to form the completed base material, the glass base material has an almost cylindrical shape at the beginning, but still has an outer diameter that fluctuates along the longitudinal direction. When optical fiber is drawn from a completed base material with a large amount of outer diameter fluctuation, the clearance between the base material insertion opening of the drawing device and the glass base material for optical fiber 3 changes during the drawing, and therefore the air flow within the furnace of the drawing device changes. As a result, the characteristics of the drawn optical fiber change in the drawing direction, thereby lowering the quality of the optical fiber.

Accordingly, by further decreasing the outer diameter fluctuation of the completed base material, the quality of the optical fiber can be improved. Therefore, when processing the glass base material for optical fiber 3 to form the completed base material, the amount of diameter reduction is increased at locations of the glass base material for optical fiber 3 with a large outer diameter and the amount of diameter reduction is decreased at locations of the glass base material for optical fiber 3 with a small outer diameter, thereby forming a completed base material with a small amount of outer diameter fluctuation.

However, in a case where the average diameter reduction amount for the glass base material for optical fiber 3 is 5 mm or more, for example, the heating capacity of the glass base material for optical fiber 3 fluctuates locally at locations in front of and behind locations where the outer diameter fluctuation is large. As a result, portions with a small diameter experience more diameter reduction than portions with a large diameter, which emphasizes the outer diameter fluctuation. Furthermore, the same phenomenon occurs when local outer diameter fluctuation in the glass base material for optical fiber 3 is shorter than the length of the uniform heating band of the heat source 5. Therefore, it is difficult to manufacture a completed base material with a small amount of outer diameter fluctuation.

Figure 2:
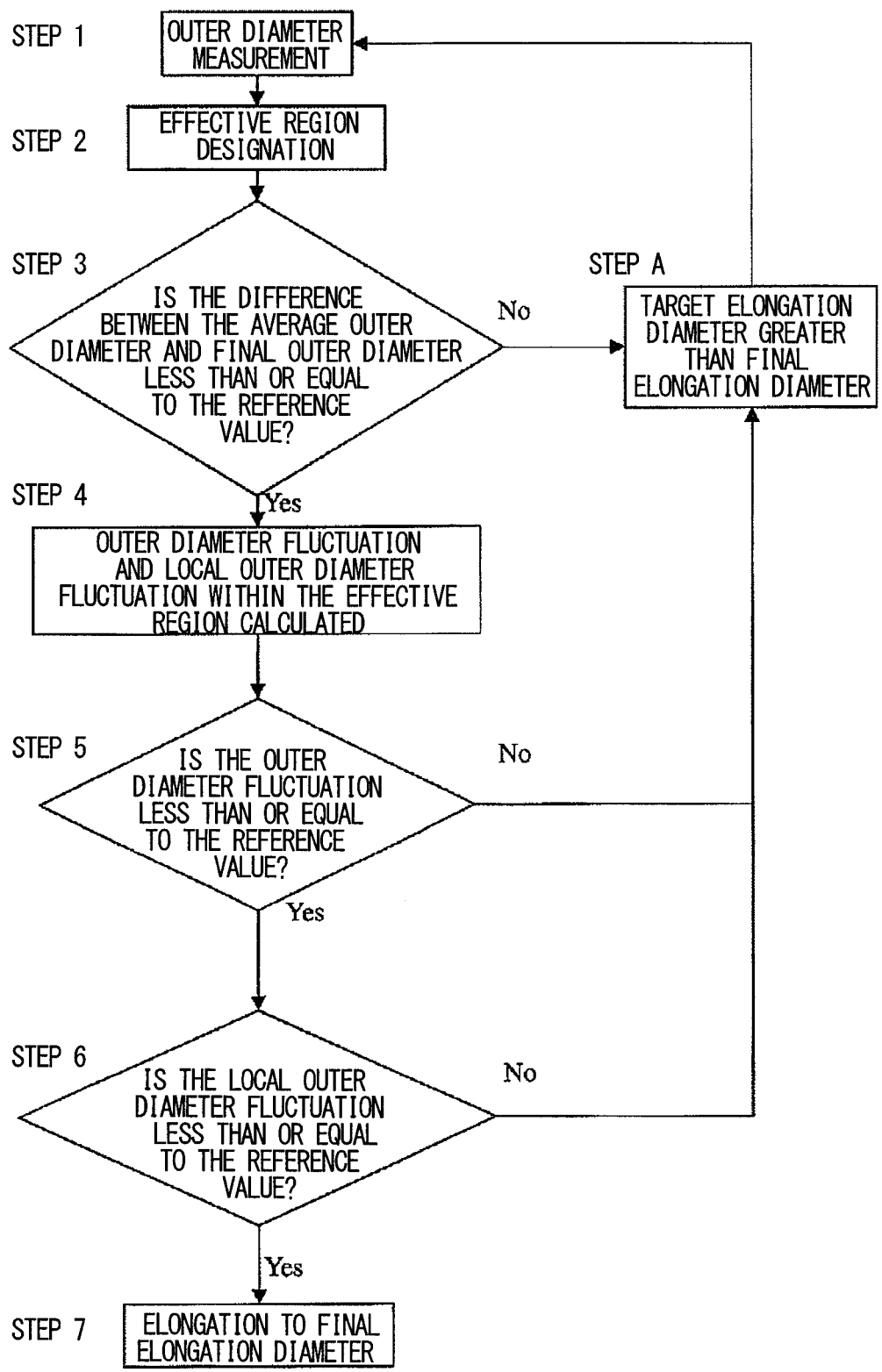
FIG. 2 is a block diagram of the processing procedure of a glass base material for optical fiber 3.

FIG. 2 shows the flow of the procedure performed when processing the glass base material for optical fiber 3 to form the completed base material. The following further describes the procedure shown in the drawing.

Step 1:

First, at Step 1, the outer diameter of the glass base material for optical fiber 3 that is to undergo the elongation process and become the completed base material is measured. The outer diameter measurement is an outer diameter distribution obtained by measuring the outer diameter of the glass base material for optical fiber 3 at a plurality of measurement positions arranged at short measurement intervals in the longitudinal direction of the glass base material for optical fiber 3. Based on this outer diameter distribution, the final elongation diameter, which is the outer diameter of the glass base material for optical fiber 3 that has finally become the completed base material, can be set.

As a specific example, measurement of the outer diameter and movement of the glass base material for optical fiber 3 having the dummy rods 2 attached thereto and held by the glass lathe 1 in the longitudinal direction are repeated. As a result, the length of the glass base material for optical fiber 3 is also measured. The small measurement intervals are preferably as narrow as possible within a range allowable by the work time and other factors, and may be intervals that are no greater than 10% of the width of the uniform heating band, which is the band across which the heating temperature of the heat source 5 is uniform, in the longitudinal direction of the glass base material for optical fiber 3.

Step 2:

Next, at step 2, the effective region is designated for the glass base material for optical fiber 3 to undergo processing. The effective region is designated as one effective region of one glass base material for optical fiber 3 that is continuous in the longitudinal direction, in consideration of optical uniformity, the presence of air bubbles, and the like. The effective region is designated such that the volume of the glass base material for optical fiber 3 within this region is greater than or equal to the volume of the completed base material calculated from the final elongation diameter and length at completion.

The volume of the effective region is calculated by using the measurement data obtained via the outer diameter measurement described above and calculating the volume of a conical portion assumed to exist between a measurement position and an adjacent measurement position, based on the outer diameter measurement values at each of these measurement positions. The effective region may be set to include an allowance for the volume of the completed base material that is approximately 10% of the volume of the glass base material for optical fiber 3. In this way, it is possible to compensate for changes in volume caused by the scattering of silica glass from the surface during the elongation processing.

The elongation process performed on the glass base material for optical fiber 3 by the glass lathe 1 can decrease the outer diameter of the glass base material for optical fiber 3, but cannot increase the outer diameter of the glass base material for optical fiber 3. Accordingly, when setting the effective region, there is a condition that the outer diameter of the glass base material for optical fiber 3 must be greater than or equal to the final elongation diameter across the entire length of the effective region.

Step 3:

Next, at step 3, the average outer diameter and the outer diameter fluctuation value are calculated for the set effective region of the glass base material for optical fiber 3, and an investigation is made as to whether the outer diameter difference between the calculated average outer diameter and the final elongation diameter described above exceeds a predetermined outer diameter difference reference value. If this difference does exceed the outer diameter difference reference value (Step 3: NO), then the process moves to step A where a target elongation diameter that is greater than the final elongation diameter is set and the glass base material for optical fiber 3 is elongated.

The elongation amount needed to reach the set target elongation diameter is less than or equal to the outer diameter difference reference value described above. Furthermore, the elongation of the glass base material for optical fiber 3 in step A is performed using a movement speed and heating amount for the heat source 5 determined on a condition that the elongation changes the outer diameter from the calculated average outer diameter to the target elongation diameter.

After this, the outer diameter measurement (Step 1), the effective region designation (Step 2), and the calculation of the difference between the average outer diameter and the final elongation diameter (Step 3) are repeated on the glass base material for optical fiber 3 that has been elongated to realize the target elongation diameter. Steps 1 to 3 described above are repeated until, at Step 3, the difference between the average outer diameter and the final elongation diameter is less than or equal to the outer diameter difference reference value (Step 3: YES).

If the outer diameter of the glass base material for optical fiber 3 is measured at uniform intervals in the longitudinal direction, the average outer diameter calculated at Step 3 may be calculated as the simple arithmetic average of the measurement values of the outer diameter. If the outer diameter measurement positions are not at uniform intervals on the glass base material for optical fiber 3, the average outer diameter calculated at Step 3 may be calculated as a weighted average value that takes into consideration the intervals between the measurement positions.

The outer diameter difference reference value is preferably less than or equal to 10% of the final elongation diameter. For example, when processing a glass base material for optical fiber 3 with an average outer diameter of 80 mm to form a completed base material with a final elongation diameter of 50 mm, the outer diameter difference reference value is preferably less than or equal to 5 mm.

The target elongation diameter set in Step A may be set such that the difference between the average outer diameter and the final elongation diameter resulting from one instance of the elongation process is less than or equal to the outer diameter difference reference value, or Steps 1 to 3 may be repeated until the difference between the average outer diameter and the target elongation diameter is less than or equal to the outer diameter difference reference value. In this case, the target elongation diameter may be calculated using Expression 1 shown below.

$$\{\text{average outer diameter} \times k + \text{final elongation diameter} \times (1-k)\} \quad \text{Expression 1:}$$

In the above expression, k may be a value that is greater than or equal to 0.25 and less than or equal to 0.75, where a larger value for k indicates a greater number of elongation steps.

Using the example described above, after performing the first elongation step of the elongation process in which the target elongation value is a diameter of 60 mm (k=0.33 for the average outer diameter of 80 mm and the final elongation diameter of 50 mm), the second elongation step of the elongation process may be performed with a target elongation value of a diameter of 53 mm (k=0.3 for the average outer diameter of 60 mm), for which the outer diameter difference between the average outer diameter and the final elongation diameter is within 10% of the final elongation diameter.

In Expression 1 above, if the value of k is less than 0.25, the difference between the outer diameter of the glass base material for optical fiber 3 before elongation and the outer diameter after elongation is small, and therefore the effect of reducing the outer diameter fluctuation is difficult to realize. Furthermore, since the number steps repeated in the elongation process increases, the manufacturability of the completed base material is worse. Furthermore, in Expression 1 above, if the value of k is greater than 0.75, when the elongation process is performed, the regions with localized small diameters experience further diameter reduction, which might cause the outer diameter to be less than the final elongation diameter. Accordingly, the value of k is preferably in a range that satisfies Expression 2 below.

$$0.25 \leq k \leq 0.75 \quad \text{Expression 2:}$$

Furthermore, when considering improvements to both manufacturability and quality, the value of k may be in a range that satisfies Expression 3 shown below.

$$0.4 \leq k \leq 0.6 \quad \text{Expression 3:}$$

In addition, in order to simplify the work performed during the elongation process, k may be set to a value that allows for easy calculation, such as a value of 0.5.

Step 4:

If the difference between the average outer diameter and the final elongation diameter in the effective region is less than or equal to the outer diameter difference reference value described above in Step 3 (Step 3: YES), then at Step 4, the outer diameter of the glass base material for optical fiber 3 in the effective region is again measured at small intervals, and the outer diameter fluctuation and local outer diameter fluctuation value are calculated.

The outer diameter measurement is performed by measuring the outer diameter of the glass base material for optical fiber 3 at small measurement intervals in the longitudinal direction of the glass base material for optical fiber 3, in the same manner as in Step 1. Specifically, measurement of the outer diameter and movement of the glass base material for optical fiber 3 having the dummy rods 2 attached thereto and held by the glass lathe 1 in the longitudinal direction are repeated. As a result, the length of the glass base material for optical fiber 3 is also measured. The small measurement intervals are preferably as narrow as possible, and may be intervals that are no greater than 10% of the width of the uniform heating band, which is the band across which the heating amount of the heat source 5 is uniform, in the longitudinal direction of the glass base material for optical fiber 3.

The outer diameter fluctuation value calculated in Step 4 may be calculated as the difference between the maximum outer diameter and the minimum outer diameter of the glass base material for optical fiber 3 as measured in the effective region. The local outer diameter fluctuation value refers to the highest value among regional outer diameter fluctuation values obtained by dividing the effective region of the glass base material for optical fiber 3 into a plurality of evaluation regions and, for each of these evaluation regions, measuring the regional outer diameter fluctuation value.

The width of each evaluation region set when calculating the local outer diameter fluctuation value may be set to be the width of the uniform heating band of the heat source 5. If a heating resistor is used as the heat source 5, the width of the uniform heating band of the heat source 5 may be treated as being substantially equal to the width of the heating resistor itself in the longitudinal direction of the glass base material for optical fiber 3. If a flame burner is used as the heat source 5, the width of the uniform heating band may be treated as being approximately three times the diameter of the burner opening.

Step 5:

Next, at Step 5, an investigation is made as to whether the outer diameter fluctuation value within the effective region does not exceed the outer diameter fluctuation reference value. If the outer diameter fluctuation value does exceed the predetermined outer diameter fluctuation reference value (Step 5: NO), Step A described above is performed to set a target elongation diameter that is greater than the final elongation diameter, the elongation process is again performed on the glass base material for optical fiber 3, and then the process returns to Step 1 and Steps 1 to 4 are repeated. In this way, excessively large outer diameter fluctuation values are lowered.

The target elongation diameter set when the process moves to Step A after Step 5 may also be set such that the difference between the average outer diameter and the final elongation diameter resulting from one instance of the elongation process is less than or equal to the outer diameter difference reference value, or Steps 1 to 4 may be repeated until the difference between the average outer diameter and the target elongation diameter becomes less than or equal to the outer diameter difference reference value. In this case as well, the target elongation diameter may be calculated using Expression 1 shown above.

The outer diameter fluctuation reference value described above may be within $1/25$, i.e. 4%, of the final elongation diameter, for example. In the example described above, when the final elongation diameter is 50 mm, for example, the outer diameter fluctuation reference value is set to a predetermined value of less than or equal to 2 mm. At Step 5, if the outer diameter fluctuation value within the effective region is less than or equal to the outer diameter fluctuation reference value (Step 5: YES), the process moves to Step 6.

Step 6:

At Step 6, an investigation is made as to whether the local outer diameter fluctuation value of the glass base material for optical fiber 3 does not exceed a predetermined local outer diameter fluctuation reference value. If the local outer diameter fluctuation value does exceed the predetermined local outer diameter fluctuation reference value (Step 6: NO), Step A is performed to set a target elongation diameter that is greater than the final elongation diameter, the elongation process is again performed on the glass base material for optical fiber 3, and then the process again returns to Step 1 and Steps 1 to 5 are repeated. In this way, excessively large outer diameter fluctuation values occurring locally are reduced.

If there is a large outer diameter fluctuation remaining in any of the evaluation regions used when calculating the local outer diameter fluctuation value, outer diameter fluctuation that has not been corrected might remain after the elongation process is performed to reduce the diameter of the glass base material for optical fiber 3. Accordingly, the local outer diameter fluctuation reference value is preferably within ⅔ of a final outer diameter fluctuation allowable value, which is an allowable value for the outer diameter fluctuation value in the completed base material. In the example described above, when the final outer diameter fluctuation allowable value is 5% of the final elongation diameter, the final outer diameter fluctuation allowable value is 2.5 mm for a completed base material with a final elongation outer diameter of 50 mm. Accordingly, the local outer diameter fluctuation reference value may be set to 1.7 mm, which corresponds to ⅔ of the final outer diameter fluctuation allowable value.

The target elongation diameter set when the process moves to Step A after Step 6 may also be set such that the difference between the average outer diameter and the final elongation diameter resulting from one instance of the elongation process is less than or equal to the outer diameter difference reference value, or Steps 1 to 4 may be repeated until the difference between the average outer diameter and the target elongation diameter becomes less than or equal to the outer diameter difference reference value. In this case as well, the target elongation diameter may be calculated using Expression 1 shown above. At Step 6, if the local outer diameter fluctuation value within the effective region is less than or equal to the local outer diameter fluctuation reference value (Step 6: YES), the process moves to Step 7.

Step 7:

At Step 7, the glass base material for optical fiber 3 is processed until reaching the final elongation diameter, thereby manufacturing the completed base material. In this way, respective steps are performed to set the difference between the final outer diameter and the average outer diameter to be less than or equal to the outer diameter difference reference value, to set the outer diameter fluctuation to be less than or equal to the outer diameter fluctuation reference value, and to set the local outer diameter fluctuation value to be less than or equal to the local outer diameter fluctuation reference value, and after these steps the elongation process is performed to manufacture the completed base material, thereby realizing manufacturing of a completed base material having high outer diameter precision, with high yield and efficiency. Furthermore, by measuring the outer diameter of the glass base material for optical fiber 3 at small intervals in the longitudinal direction before the elongation, the effective region can be set with precision and it is possible to ensure that the length of the completed base material is greater than the target length.

The series of steps described above in the elongation process using the glass lathe 1 to form the completed base material from the glass base material for optical fiber 3 can be automated. In other words, before the elongation process, the outer diameter of the glass base material for optical fiber 3 may be measured at small intervals in the longitudinal direction and the elongation speed may be adjusted to realize an elongation amount, i.e. a diameter reduction amount, corresponding to the outer diameter at the heating positions. Here, after setting the heating amount by the heat source 5 to be sufficient for softening the glass base material for optical fiber 3, while heating the glass base material by moving the heat source 5 relative to the glass base material in one direction at a constant speed in the longitudinal direction of the glass base material, the movement speeds of the chucks are adjusted such that the space between the left and right chucks increases according to the outer diameter of the portion being heated.

The adjustment amount of the adjustment described above is strictly calculated by taking the mass balance of the length of the widened space between the chucks and the target elongation diameter, relative to the movement distance of the heat source and the local outer diameter prior to processing. Specifically, in a given reaction system, the general relationship shown below is established. (inflow amount to the system)=(outflow amount from the system)+(accumulation amount within the system)

When processing the glass base material for optical fiber 3 as described above, the accumulation amount within the system can be treated as being zero, and therefore the mass balance can be realized by calculating the movement amount (movement speed) of the chucks (and the heat source), such that the relationship shown below is established. (inflow amount at the heating position)=(outflow amount from the heating position)

Accordingly, using the glass lathe 1 shown in FIG. 1, on the condition that the heat source 5 is fixed, in a case where a base material with an outer diameter of $D_1$ is input at a speed of $V_1$ from the left side in the drawing and the elongated base material with a diameter of $D_2$ and is output at a speed of $V_2$ from the right side, the mass balance can be realized based on Expression 4 shown below.

$$\pi \rho D_1^2 V_1 = \pi \rho D_2^2 V_2 \qquad \text{Expression 4:}$$

Here, $\pi$ is the circumference ratio and $\rho$ is the density.

Furthermore, the above relationship is also established in a case where, in the glass lathe 1, the chuck on the left side in the drawing is fixed, the heat source 5 is moved to the left of the drawing at a speed of $-V_1$, and the chuck on the right side in the drawing is moved at a speed of $V_2-V_1$.

In this way, the in the method of processing the glass base material for optical fiber 3 described above, when the outer diameter difference between the average outer diameter and the final elongation diameter, the outer diameter fluctuation value, and the local outer diameter fluctuation value exceed respective predetermined reference values, a target elongation diameter larger than the final elongation diameter is determined and the elongation steps are repeated until the this target elongation diameter is reached and the outer diameter difference, the outer diameter fluctuation value, and the local outer diameter fluctuation are less than or equal to the respective reference values, at which point the elongation process is performed until reaching the final elongation diameter. In this way, it is possible to efficiently and precisely set the outer diameter of the glass base material. Furthermore, it is possible to ensure that the completed base material has a length greater than or equal to the target length. The elongation steps performed during the processing can proceed efficiently according to comparisons with each type of reference value, and therefore there is no need for additional unnecessary elongation steps, so that the processing time can be shortened.

In the example described above, the target elongation diameter that is larger than the final elongation diameter is calculated based on the reference values for the average outer diameter, the outer diameter fluctuation value, and the local outer diameter fluctuation value in the effective region of the glass base material for optical fiber 3, and then the process for elongating the glass base material for optical fiber 3 is performed. However, among the average outer diameter, the outer diameter fluctuation value, and the local outer diameter fluctuation value, the reference values of one or both of the outer diameter fluctuation value and the local outer diameter fluctuation value may be omitted from the determination, and Step 7 of the elongation process may be performed until reaching the final elongation diameter. In this case, some or all of Steps 4 and 5 shown in FIG. 2 are omitted.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

1: glass lathe, 2: dummy rod, 3: glass base material for optical fiber, 4: diameter measurement device, 5: heat source

What is claimed is:

1. A method of processing a glass base material for optical fiber in which the glass base material for optical fiber is elongated to reduce a diameter thereof until reaching a final elongation diameter and form a completed base material, the method comprising:

before a first elongation of the glass base material for optical fiber, measuring an outer diameter distribution that includes an outer diameter of the glass base material for optical fiber at a plurality of measurement points in a longitudinal direction of the glass base material for optical fiber;

setting an effective region that is continuous in the longitudinal direction in the glass base material for optical fiber, based on the measured outer diameter;

setting a first target elongation diameter that is larger than the final elongation diameter and less than an average diameter of the effective region of the glass base material for optical fiber that is calculated based on the measured outer diameter, and performing the first elongation of the glass base material for optical fiber, having the measured outer diameter, until at least the entire effective region has reached the first target elongation diameter; and after the first elongation, performing a final elongation of the glass base material for optical fiber until at least the entire effective region has reached the final elongation diameter;

after the first elongation of the glass base material for optical fiber and before the final elongation of the glass base material for optical fiber, measuring the outer diameter of the glass base material for optical fiber at a plurality of measurement points in the longitudinal direction of the glass base material for optical fiber and calculating the average outer diameter of the glass base material for optical fiber in the effective region from the measured outer diameter at the plurality of measurement points;

determining that an outer diameter difference that is a difference between the average diameter and the final elongation diameter is greater than a predetermined outer diameter difference reference value; and before the final elongation, performing a third elongation of the glass base material for optical fiber until at least the entire effective region has reached a third target elongation diameter that is less than the average outer diameter and more than the final elongation diameter, wherein the first target elongation diameter is consistent with Expression 1, Expression 1 is {average outer diameter×k+final elongation diameter×(1−k)}, k satisfies Expression 2, and Expression 2 is 0.25≤k≤0.75.

2. The method of processing the glass base material for optical fiber according to claim 1, wherein a value of k satisfies Expression 3, and Expression 3 is 0.4≤k≤0.6.

3. The method of processing the glass base material for optical fiber according to claim 1, wherein the outer diameter difference reference value is less than or equal to 10% of the final elongation diameter.

4. The method of processing the glass base material for optical fiber according to claim 1, wherein the effective region of the glass base material for optical fiber has a volume that is greater than or equal to a volume of the completed base material calculated from the final elongation diameter and the length of the completed base material.

5. A method of processing a glass base material for optical fiber in which the glass base material for optical fiber is elongated to reduce a diameter thereof until reaching a final elongation diameter and form a completed base material, the method comprising:

before a first elongation of the glass base material for optical fiber, measuring an outer diameter distribution that includes an outer diameter of the glass base material for optical fiber at a plurality of measurement points in a longitudinal direction of the glass base material for optical fiber;

setting an effective region that is continuous in the longitudinal direction in the glass base material for optical fiber, based on the measured outer diameter;

setting a first target elongation diameter that is larger than the final elongation diameter and less than an average diameter of the effective region of the glass base material for optical fiber that is calculated based on the measured outer diameter, and performing the first elongation of the glass base material having the measured outer diameter for optical fiber until at least the entire effective region has reached the first target elongation diameter; and after the first elongation, performing a final elongation of the glass base material for optical fiber until at least the entire effective region has reached the final elongation diameter;

after the first elongation of the glass base material for optical fiber and before the final elongation of the glass base material for optical fiber, measuring the outer diameter of the glass base material for optical fiber at a plurality of measurement points in the longitudinal direction of the glass base material for optical fiber and calculating an outer diameter fluctuation value that is a difference between a maximum diameter and a minimum diameter of the glass base material for optical fiber in the effective region;

determining that the outer diameter fluctuation value is greater than a predetermined outer diameter fluctuation reference value; and before the final elongation, performing a fourth elongation of the glass base material for optical fiber until at least the entire effective region has reached a fourth target elongation diameter that is less than the average outer diameter and more than the final elongation diameter.

6. The method of processing the glass base material for optical fiber according to claim 5, wherein
the outer diameter fluctuation reference value is less than or equal to $1/25$ of the final elongation diameter.

7. A method of processing a glass base material for optical fiber in which the glass base material for optical fiber is elongated to reduce a diameter thereof until reaching a final elongation diameter and form a completed base material, the method comprising:

before a first elongation of the glass base material for optical fiber, measuring an outer diameter distribution that includes an outer diameter of the glass base material for optical fiber at a plurality of measurement points in a longitudinal direction of the glass base material for optical fiber;

setting an effective region that is continuous in the longitudinal direction in the glass base material for optical fiber, based on the measured outer diameter;

setting a first target elongation diameter that is larger than the final elongation diameter and less than an average diameter of the effective region of the glass base material for optical fiber that is calculated based on the measured outer diameter, and performing the first elongation of the glass base material having the measured outer diameter for optical fiber until at least the entire effective region has reached the first target elongation diameter;

after the first elongation, performing a final elongation of the glass base material for optical fiber until at least the entire effective region has reached the final elongation diameter;

after the first elongation of the glass base material for optical fiber and before the final elongation of the glass base material for optical fiber, dividing the effective region into a plurality of measurement regions in the longitudinal direction of the glass base material for optical fiber and calculating a local outer diameter fluctuation value that is a difference between a maximum diameter and a minimum diameter of the glass base material for optical fiber in each of the measurement regions;

determining that the local outer diameter fluctuation value is greater than a predetermined local outer diameter fluctuation reference value; and before the final elongation, performing a fifth elongation of the glass base material for optical fiber until at least the entire effective region has reached a fifth target elongation diameter that is less than the average outer diameter of the glass base material for optical fiber in the effective region and more than the final elongation diameter.

8. The method of processing the glass base material for optical fiber according to claim 7, wherein
each of the plurality of measurement regions has a width in the longitudinal direction of the glass base material for the optical fiber corresponding to a width of a uniform heating band of a heat source that performs heating when elongating the glass base material for optical fiber.

* * * * *